United States Patent [19]

Kaufman et al.

[11] Patent Number: 5,418,781
[45] Date of Patent: May 23, 1995

[54] ARCHITECTURE FOR MAINTAINING THE SEQUENCE OF PACKET CELLS TRANSMITTED OVER A MULTICAST, CELL-SWITCHED NETWORK

[75] Inventors: Charles W. Kaufman, Northborough; Radia J. Perlman, Acton, both of Mass.

[73] Assignee: Digital Equipment Corporation, Maynard, Mass.

[21] Appl. No.: 284,913

[22] Filed: Aug. 2, 1994

Related U.S. Application Data

[63] Continuation of Ser. No. 96,096, Jul. 23, 1993, abandoned.

[51] Int. Cl.6 ........................................... H04Q 11/04
[52] U.S. Cl. .......................................... 370/60; 370/61
[58] Field of Search ................ 370/60, 61, 58.1, 94.1, 370/58.2, 58.3, 60.1

[56] References Cited

U.S. PATENT DOCUMENTS

| | | | |
|---|---|---|---|
| 4,630,260 | 12/1986 | Tay et al. | 370/60 |
| 4,939,720 | 7/1990 | Bakka | 370/60 |
| 4,947,387 | 8/1990 | Knorpp et al. | 370/60 |
| 5,016,159 | 5/1991 | Maruyama | 370/60 |
| 5,128,931 | 7/1992 | Yamanaka et al. | 370/60 |
| 5,287,346 | 2/1994 | Bianchini et al. | 370/60 |

OTHER PUBLICATIONS

Schroeder et al., *Autonet: A High-speed, Self-configuring Local Area Network Using Point-to-point Links*, Digital Equipment Corporation, Systems Research Center, Palo Alto, Calif. (Apr. 1990).

Tanenbaum, *Computer Networks*, Prentice Hall, Inc., Englewood Cliffs, New Jersey (Dec. 1988), pp. 306–308.

Perlman, *Interconnections: Bridges and Routers*, Addison-Wesley Publishing Co., Inc., Reading, Mass. (Dec. 1992), pp. 253–255.

*Primary Examiner*—Douglas W. Olms
*Assistant Examiner*—Huy D. Vu
*Attorney, Agent, or Firm*—Arthur W. Fisher; Denis G. Maloney; Diane C. Drozenski

[57] ABSTRACT

A novel switch architecture maintains the sequence of packet cells, received at one port of a multicast port group, during subsequent transfer of the cells to the remaining ports of the group. The novel architecture includes a 2-stage buffering arrangement whereby the first stage comprises a plurality of local buffers, each associated with a port of the switch, and the second stage comprises a single, global buffer. Each local buffer services its associated port of the multicast port group by temporarily storing incoming packet cells until a complete packet is received at that port, at which time the packet cells may be passed to the global buffer as outgoing cells. The global buffer services the remaining ports of the multicast port group by forwarding copies of the outgoing cells, in sequence, to those ports.

6 Claims, 5 Drawing Sheets

ARCHITECTURE FOR MAINTAINING THE SEQUENCE OF PACKET CELLS TRANSMITTED OVER A MULTICAST, CELL-SWITCHED NETWORK

This application is a continuation, of application Ser. No. 08/096,096, filed Jul. 23, 1993, now abandoned.

CROSS-REFERENCE TO RELATED APPLICATIONS

The invention is related to the following co-pending U.S. patent application assigned to the assignee of the present application: METHOD AND APPARATUS FOR SELECTIVE INTERLEAVING IN A CELL-SWITCHED NETWORK, by Radia Perlman et al., filed Jul. 23, 1993, Ser. No. 08/097,255.

1. Field of the Invention

This invention relates generally to network systems and, more specifically, to the architecture of switching elements of a multicast, cellswitched network.

2. Background of the Invention

A computer network typically comprises a collection of interconnected nodes, such as computer systems and switches, which may, in turn, be connected through an irregular configuration of transmission lines, i.e., links. The switches are specialized computers used to connect two or more links. Data is exchanged among nodes of such an "arbitrary-topology" network by passing packets from switch to switch over the links. Specifically, when a packet arrives on an incoming link, the switch decides onto which of the outgoing links that packet will be forwarded.

In a connection-oriented network, a virtual circuit is commonly established when exchanging packets between nodes of the network. The virtual circuit is a temporary logical path connection that requires a set up procedure to "open" the virtual circuit prior to transferring the data packets and a release procedure to "close" the circuit once the data transfer is complete. This obviates the need for effecting routing decisions for each data packet that is transferred between the nodes once the circuit is opened. In addition, the virtual circuit minimizes the overhead required for exchanging packets in the network by enabling use of a relatively short virtual circuit (VC) number in the header field of a packet instead of longer source and destination addresses.

Figure 1A:
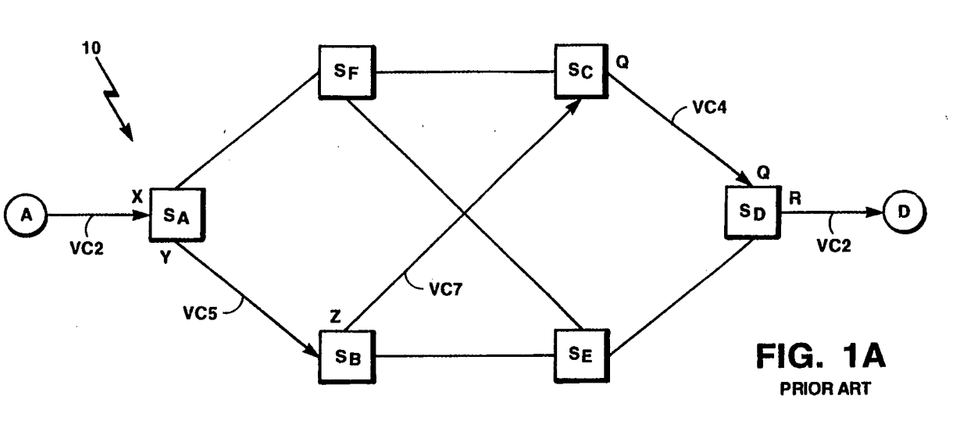
FIG. 1A is a diagram of a conventional point-to-point, virtual circuit connecting a source node and a destination node.
Figure 1B:
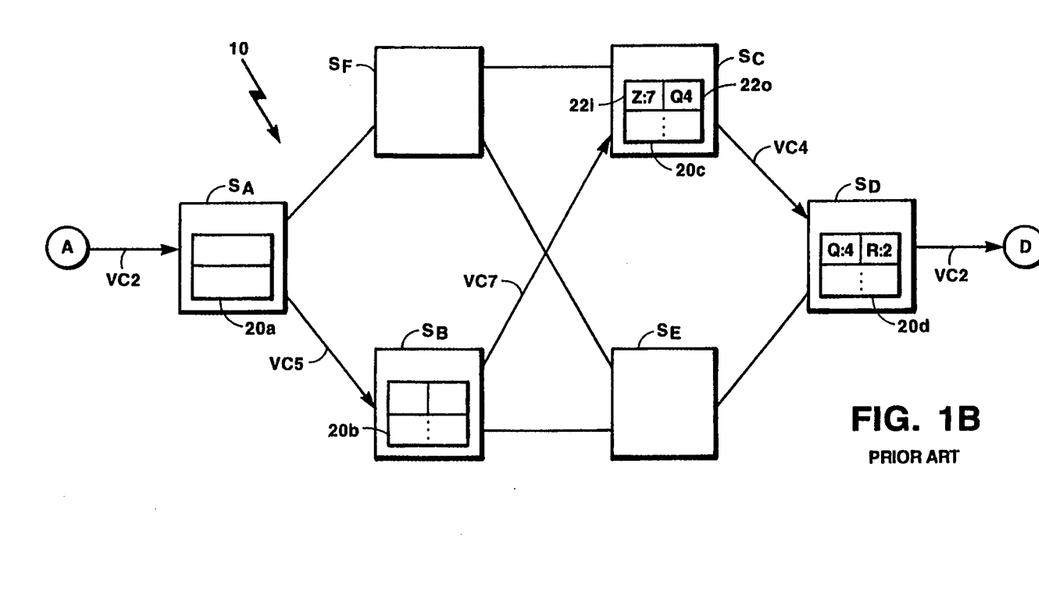
FIG. 1B is a block diagram of conventional forwarding tables and the information contained therein relating to the virtual circuit of FIG. 1A.

For point-to-point communication, the set up procedure creates a virtual circuit by allocating certain switches and links in the network to establish the "best" route, according to conventional route configuration techniques, between a source node and a destination node. To illustrate, refer to FIG. 1A. Here, node A of network 10 performs a set up procedure to open a virtual circuit route that encompasses the switches $S_{A-D}$. This route is identified by a VC number, VC2, that is associated with node A's local switch $S_A$. In order to ensure that data packets subsequently transferred from node A always follow this virtual circuit route to node D, each switch along VC2 maintains a forwarding table with entries indicating where to forward the data packets in accordance with the routing configuration results. Fig. 1B illustrates the forwarding tables $20a$–$d$ contained within the switches $S_{A-D}$ of the network 10. Each entry of the tables includes an incoming portion and an outgoing portion, with each portion including a port name and a VC number associated with that port. Each data packet transferred over the network contains a VC field identifying the open VC number on which it has arrived. Thus, when a packet is received at an incoming port of switch $S_c$, that switch searches the left (incoming) portion $22i$ of its table $20c$, using the incoming port, e.g., Z, and VC number found in the packet, e.g., VC7, as the key. When a match is found, the outgoing portion $22o$ of the entry identifies the VC number, e.g., VC4, to insert into the VC field of the packet and the port, e.g., Q, to which it should pass the packet. It is thus apparent that the VC numbers and forwarding tables provide enough information to guide the data packets through the allocated switches and links to the destination.

Muticasting involves transmitting a single packet from a source node and having it received by a group of destination nodes. One way to implement this type of point-to-multipoint communication is via a "spanning tree", i.e., a subset of nodes and links in the network in which exactly one path is defined between any pair of nodes. The spanning tree is typically calculated by the nodes using conventional spanning tree algorithms. For example, when a multicast packet arrives at an incoming port of a switch, that switch checks a list of destination nodes contained in the packet to select a set of outgoing ports that will provide the best path to at least one of the destination nodes. This group of incoming and outgoing ports is called a multicast port group. The switch stores routing information relating to the multicast port group in its forwarding table.

Since each node maintains its own routing information, it can transmit all incoming multicast packet onto all spanning tree ports and links except the one on which the packet arrived: thus, the multicast packets traverse the tree to reach each destination node. Although this method makes excellent use of bandwidth, transmission of certain, high-priority packets through the network may be "delayed" because of the varying sizes of packets. For example, transfer of a high-priority, 10-byte packet from one port of a switch to the remaining ports of a multicast port group may be delayed until all bytes of a previously-received 100,000-byte packet are transferred through those ports.

In order to minimize this delay, some networks apportion each packet into mini-packets called cells. Each cell carries minimal addressing information, with the first cell containing the source and destination addresses, and all of the remaining cells containing merely a VC number. The cells do not contain information specifying the succession of the cells. Therefore, the sequence of the cells transmitted from a source node through a switch must be preserved in order to ensure that the cells can be reassembled into a complete packet at a destination node.

One way to ensure the order of transmitted cells is to prohibit simultaneous transfer of multicast packets through a switch. According to this approach, all outgoing ports selected by a switch for transfer of a multicast packet must be "free", i.e., there must be no data traffic flowing through the ports and over the links, before the packet can be forwarded over those links. If any of the outgoing ports are "busy", the multicast packet is stored in an internal buffer of the switch. Later, when all of the required ports are free, copies of the packet are transmitted over the links at once. However, this approach degrades the efficiency of the network, particularly because of the latency imposed on the transfer of different multicast packets through the switch.

Another approach for maintaining the sequence of cells transmitted over the network involves sending all multicast packets to a single point, i.e., a designated switch, which then forwards the cells, in succession, to their destinations. However, it is apparent that this approach may significantly decrease the throughput of the network.

Maintaining the order of transmitted cells is particularly significant in a multicast, cell-switched network with multiple sources. Because the virtual circuits of the network may have common destinations, packet cells from different sources propagating through a common multicast group of ports in a switch may have the same VC number. If the cells become interleaved, there is not enough routing information in the cells to reassemble them into complete packets at a destination node.

Therefore, it is among the objects of the invention to provide a method and apparatus for maintaining the sequence of packet cells propagating over a multicast virtual circuit in a cell-switched network.

SUMMARY THE INVENTION

The present invention resides in a novel switch architecture for maintaining the sequence of packet cells, received at one port of a multicast port group, during subsequent transfer of the cells to the remaining ports of the group. Specifically, the novel architecture includes a 2-stage buffering arrangement whereby the first stage comprises a plurality of local buffers, each associated with a port of the switch, and the second stage comprises a single, global buffer. Each local buffer services its associated port of the multicast port group by temporarily storing incoming packet cells until a complete packet is received at that port, at which time the packet cells may be passed to the global buffer as outgoing cells. The global buffer services the remaining ports of the multicast port group by forwarding copies of the outgoing cells, in sequence, to those ports. As a result, the arrangement avoids interleaving of packet cells originating from different sources, yet having a common virtual circuit (VC) number associated with a multicast group of ports in the switch.

In the illustrative embodiment of the invention, the novel architecture is implemented on a single-processor switch. Each local buffer is preferably configured as a queue with sufficient storage capacity to hold at least one entire packet of cells received at its port. The global buffer is preferably a first-in, first-out (FIFO) buffer configured to store a plurality of packets received from the local buffers and targeted for remaining ports of respective multicast port groups. Because each local buffer "feeds" the global buffer, the novel architecture also includes synchronization techniques for resolving contention for the global buffer among the local buffers.

As an example, assume cells of a first packet arrive at a port of a multicast port group and are accumulated in that port's local queue. Upon receiving the last cell of the packet, the local queue organizes the packet cells for transfer to the global FIFO buffer. For the single-processor switch configuration, control interface logic associated with the port asserts a flag which requests interruption of the processor at an interrupt priority level (IPL) that is common to all of the ports. In response to the asserted flag, the processor raises its IPL to inhibit further interrupts from other ports and acknowledges the first port's interrupt request. The contents of the first port's local queue are then forwarded to the FIFO buffer and stored at the "bottom" of the FIFO as a complete packet unit. As previously-stored packet units are transferred to ports of the switch, the first packet cells propagate to the "top" of the FIFO, where they are then forwarded, in sequence, to the remaining ports of the multicast port group.

An advantage of the invention is that the cells of a packet that are received at a local buffer and passed to the global buffer are forwarded to the remaining ports of a multicast port group in an orderly manner, thereby obviating intermingling of different cells having the same VC number.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 2:
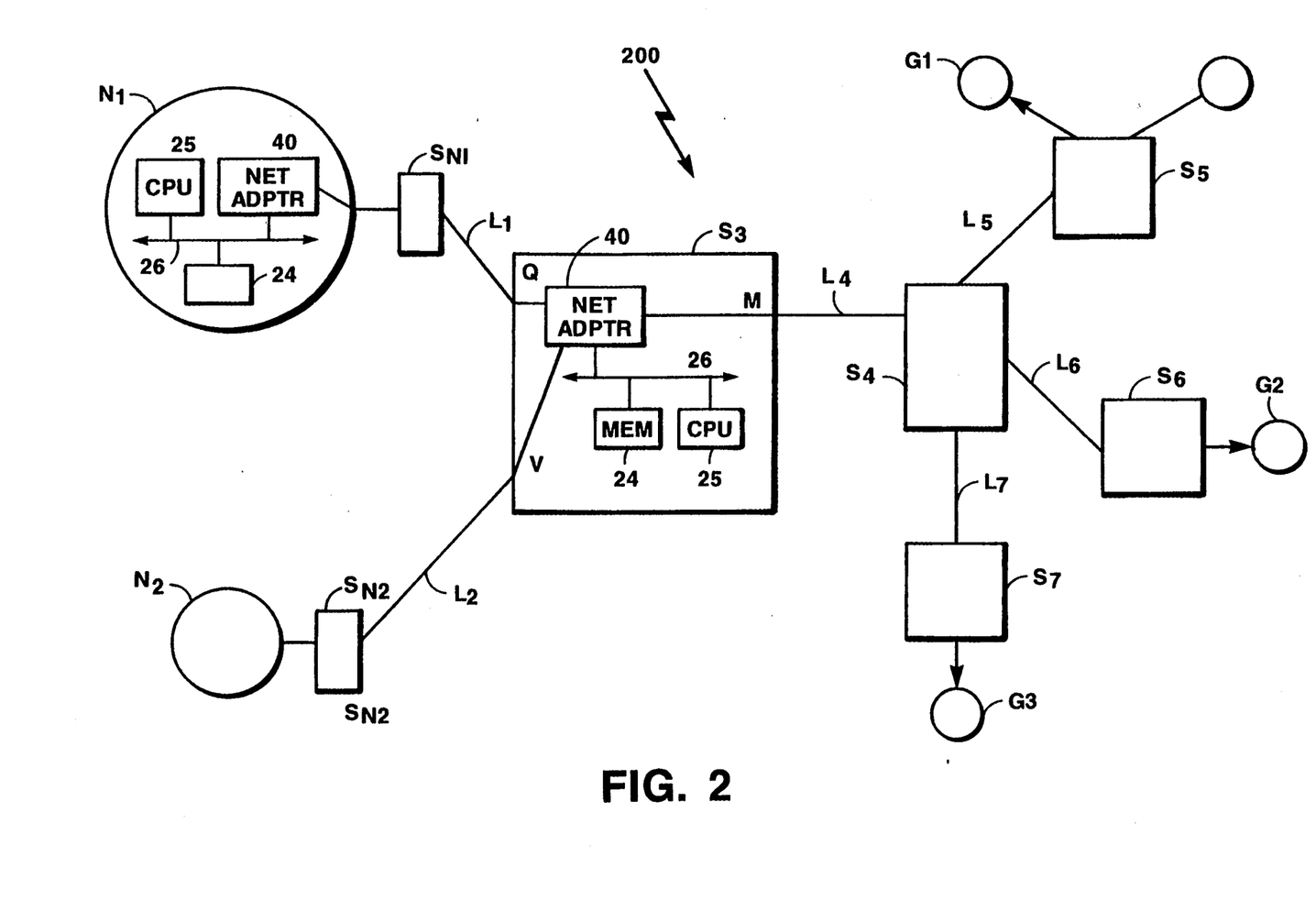
FIG. 2 is a diagram of a multicast, cell-switched network in which the novel switch architecture of this invention may be advantageously used.

FIG. 2 depicts a multicast, cell-switched network 200 of interconnected nodes in which the novel switch architecture of this invention may be advantageously used. The nodes are typically general-purpose computers comprising a plurality of source nodes N1-2 and a group of destination nodes G1-3. Each node is coupled to a respective "local" switch S, i.e., a specialized computer. Each switch S is configured to facilitate the flow of information in the network 200 by providing, along with its incoming and outgoing links L, connections between the source and destination nodes.

Each node and switch typically comprises a central processing unit (CPU) 25, a memory unit 24 and at least one network adapter 40 interconnected by a system bus 26. The main memory 24 may comprise storage locations typically composed of random access memory (RAM) devices, which are addressable by the CPU and network adapter. An operating system, portions of which are typically resident in main memory 24 and executed by CPU 25, functionally organizes the nodes and switches. The operating system invokes network operations in support of programs executing in the CPU 25. A more detailed description of the switch, including the novel architecture of the invention, is provided below in connection with FIGS. 4-6.

As previously noted, a point-to-point virtual circuit is typically established between a source node and a destination node prior to transferring packets between the nodes. A multicast connection procedure provides a means for efficiently "opening" point-to-multipoint virtual circuits between a source node and a group of destination nodes by allocating certain switches and their connecting links to establish the best routes between the nodes. Selection is effected by conventional adaptive-type routing algorithms used in route configuration analysis.

Generally, when a packet is received at an incoming port of a switch, it is stored there until the routing determination is made as to which of the outgoing ports the packet will be forwarded. This group of incoming and outgoing ports is called a multicast port group, and the switches and links allocated to the point-to-multipoint virtual circuits are elements of multicast virtual circuits. Only the switches of the multicast virtual circuits need maintain routing information relating to the destination nodes.

For the multicast, cell-switched network 200 set forth in FIG. 2, each of CPUs 25 of the source nodes N1-2 executes the multicast connection procedure to open multicast virtual circuits to a predetermined group of destination nodes. If the destinations for each circuit happen to be nodes G1-3, elements of the multicast virtual circuits may overlap. That is, the multicast port group Q, V and M of switch $S_3$ may be common to the multicast virtual circuits established by source nodes N1 and N2.

In order to open the multicast virtual circuits, each source node N may create a multicast setup packet, $MC_{13}$ SETUP, containing a multicast identifier field, a virtual circuit (VC) field and a destination nodes field, the latter field identifying a list of desired destination node addresses. The source node N forwards the packet to its local switch $S_N$, which receives the packet on an incoming port and checks the list of node addresses to select a set of outgoing ports, each of which provides the best route to at least one of the destination nodes.

Figure 3:
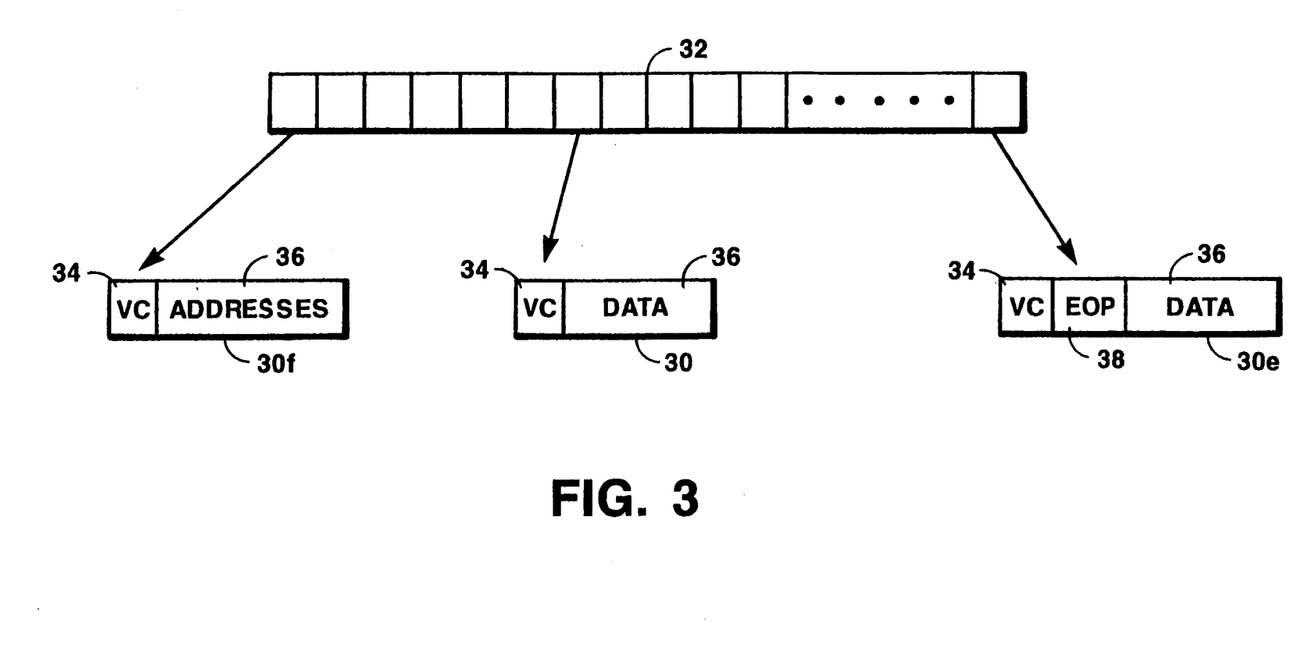
FIG. 3 illustrates the format of a cell used to exchange data among nodes of the network of FIG. 2.

If more than one outgoing port is selected, a copy of the packet is forwarded to each port. Forwarding of the packet may introduce significant delay because of the varying sizes of packets transmitted through the network. In order to minimize this delay, some networks apportion each packet into mini-packets or cells. FIG. 3 illustrates the format of a cell 30.

Specifically, the source node N divides a packet 32 into a plurality of cells 30 prior to forwarding them, in sequence, over the network 200. Each cell 30 comprises approximately 53 bytes, including a 5-byte header field 34 and a 48-byte data field 36. Each cell contains minimal addressing information, such as a VC number, in the header field 34. In addition, the data field 36 of the first cell 30f contains a source node address and a multicast address for the destination nodes, and the header field 34 of the last cell 30e contains information, e.g., an "end-of-packet" (EOP) bit 38, indicating that it is the last cell of the packet 32.

the switch $S_N$ also generates entries in an internal forwarding table for the newly-formed multicast group, with each entry containing, inter alia, routing information such as (i) the incoming port and its associated VC value acquired from the VC field and (ii) the selected outgoing ports and their associated VC values. Prior to forwarding the packets through the outgoing ports and onto the network, the switch $S_N$ updates the VC field of each packet to store the VC value associated with each selected outgoing port and modifies the destination field to store only those destinations using that particular port. This procedure is repeated at each switch of the multicast virtual circuits until each packet identifies only one destination.

At this point, the multicast virtual circuits are effectively "opened". Since each switch of the multicast virtual circuits maintains routing state relating to the multicast group of destination nodes, data packets subsequently issued by the source node N need only contain the initial local VC value in order propagate along each virtual circuit and arrive at the respective destination nodes.

When dividing a packet into cells and transmitting the cells from switch to switch, it is important that the sequence of these cells be preserved so that they can be reassembled into a complete packet at a destination node. This is particularly significant in a cell-switched network having multicast virtual circuits because certain elements of different packets may overlap and have the same VC numbers. If cells of different packets propagating through a common multicast port group of a switch become interleaved, there is not enough routing information in the cells to reassemble them into complete packets at a destination node.

In accordance with the present invention, a novel switch architecture facilitates the orderly transfer of packet cells among ports of a switch during transmission of the cells over a multicast, cell-switched network. In general, the cells are received at one port of a multicast port group and are subsequently transferred, in sequence, to the remaining ports of the group via a 2-stage buffering arrangement. This novel buffering arrangement may be implemented on a single-processor switch or a multiprocessor switch, the latter having a processor associated with each port of the switch.

Figure 4:
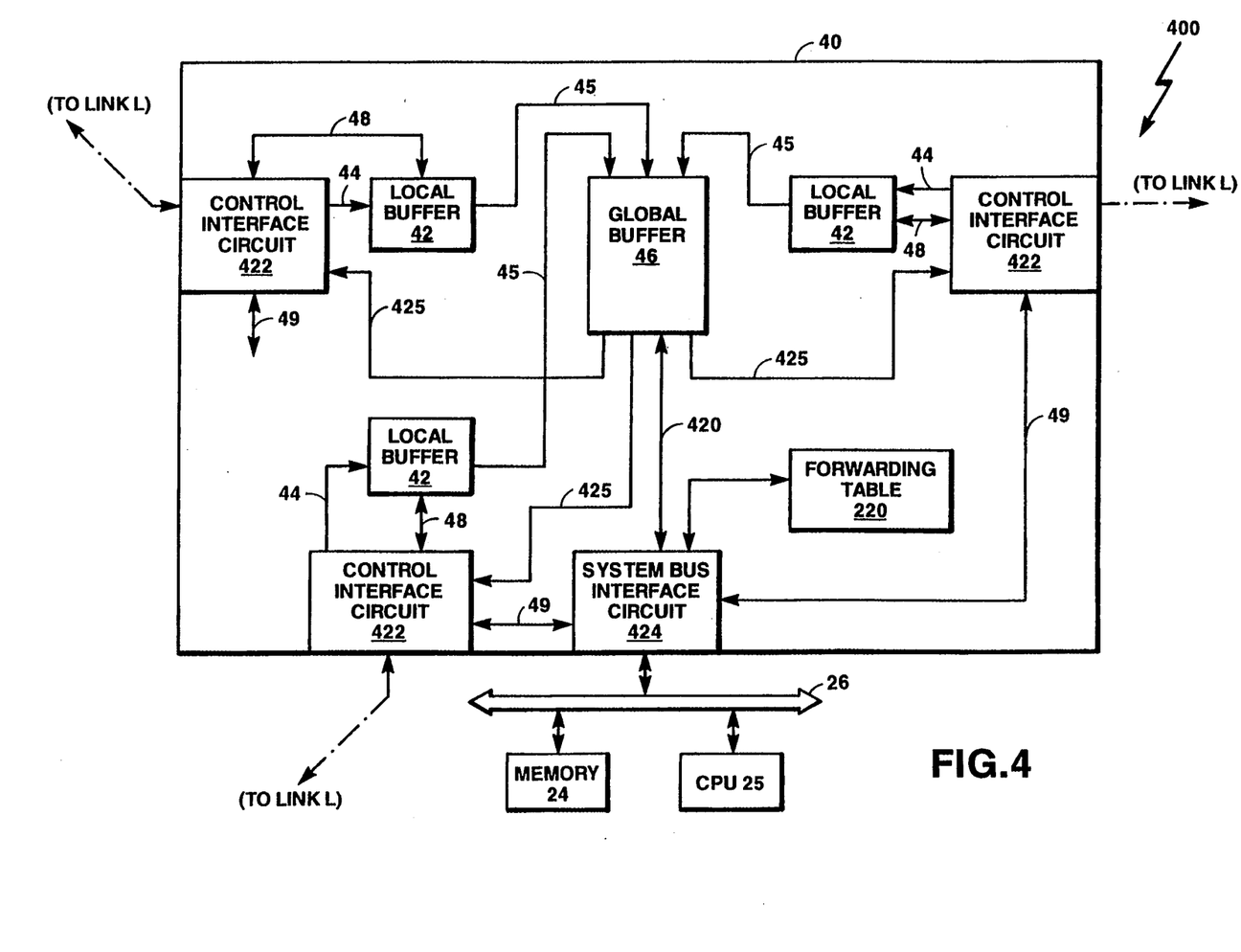
FIG. 4 is a diagram of a single-processor switch incorporating the novel architecture including a 2-level buffering arrangement in accordance with the invention.

FIG. 4 is a diagram of a single-processor switch 400 incorporating the novel, 2-stage buffering arrangement. As noted, the switch typically includes a CPU 25, a memory unit 24 and at least one network adapter 40 interconnected by a system bus 26. The network adapter 40 includes conventional control interface circuits 422 that incorporate, inter alia, the signal, electrical and mechanical characteristics, and interchange circuits, needed to interface with the links L. A system bus interface circuit 424 contains the data path logic and physical connections needed to ensure that the adapter 40 meets the timing and electrical characteristics required to communicate on the system bus 26.

The adapter 40 also includes a plurality of local buffers 42, each associated with a port of the switch 400, that collectively compose the first stage of the buffering arrangement. In the illustrative embodiment of the invention, each local buffer 42 is preferably configured as a queue with sufficient storage capacity to hold at least one entire packet of cells received at its port. Accordingly, each local buffer 42 has a data input coupled, via line 44, to a data output of its respective control interface circuit 422.

The second stage of the arrangement comprises a single, global buffer 46 having inputs coupled to the outputs of the local buffers 42 via lines 45. The global buffer also has outputs coupled to each control interface circuit 422 via lines 425. The global buffer 46 is preferably a first-in, first-out (FIFO) buffer configured to store a plurality of complete packets received from the local buffers.

Timing and control signals are provided between the control interface circuits 422 and each local buffer over lines 48 and between the control interface circuits 422 and the system bus interface circuit 424 over lines 49.

These signals control the transfers of complete packets between each local buffer and the global buffer. For example, each local buffer 42 services its associated port of the multicast port group by temporarily storing incoming packet cells until a complete packet is received at that port, at which time a "packet complete" signal is provided to the control interface circuit 422 over line 48. The circuit 422 then asserts a flag over line 49 to the system bus interface circuit 424 which, in turn, is passed to the CPU 25 and interrupts it at an interrupt priority level (IPL) that is common to all of the ports. Upon receiving a return acknowledgment from the CPU 25, the control interface circuit 422 initiates transfer of the "outgoing" packet cells from the local buffer 42 to the global buffer 46 by issuing a "transfer packet" signal over line 48.

The global buffer 46 services the remaining ports of the multicast port group by forwarding copies of these outgoing cells, in sequence, to the remaining ports over lines 425. Specifically, the packet cells are initially stored at the end of the global FIFO buffer and thereafter propagate up to the top of the buffer as previously-stored packet cells are transferred to outgoing ports. The CPU 25 utilizes information stored in the internal forwarding table 220 and relating to the multicast port groups to identify the outgoing ports receiving the packet cells and conveys this information to the global buffer 46 over line 420.

Figure 5:
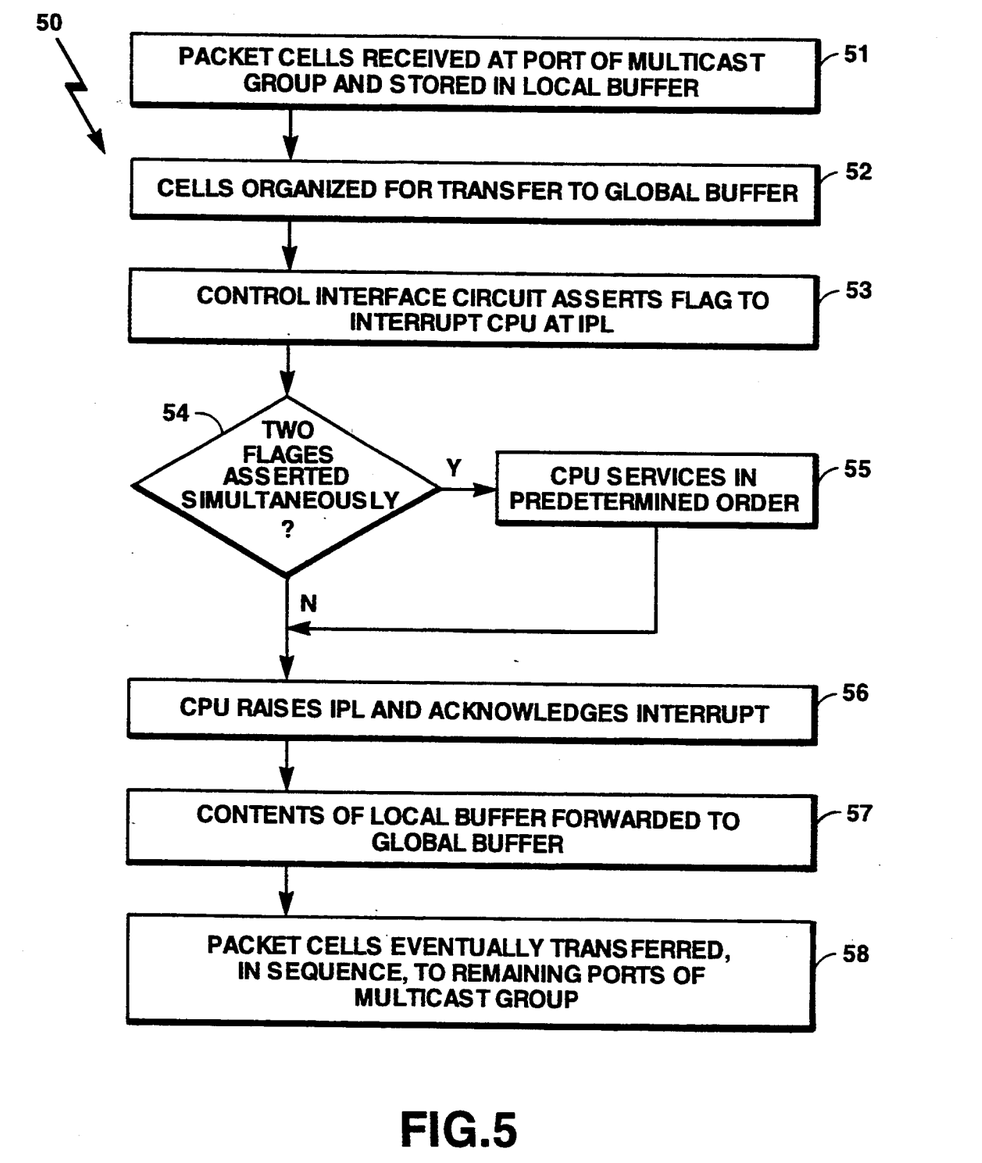
FIG. 5 is a flow diagram of the operation of a single-processor switch in accordance with the invention.

FIG. 5 is a flow diagram 50 of the operation of the single-processor switch in accordance with the invention. Assume cells of a first packet arrive at a first port of a multicast port group and are accumulated in that port's local buffer 42. (Step 51.) Upon receiving the last cell of the packet, the local buffer organizes the packet cells for transfer to the global buffer 46. (Step 52.) Control interface circuit 422 asserts a "first port" flag over line 49 which requests interruption of the CPU 25 at a particular IPL. (Step 53.) Because each local buffer "feeds" the global buffer, synchronization techniques are provided for resolving contention for the global buffer among the local buffers. Specifically, if the flags of two ports are asserted essentially simultaneously (Step 54), then the CPU services those ports in a predetermined manner. (Step 55.) For example, the CPU may execute an arbitration-type algorithm to determine which port should be serviced. Such an algorithm may include a simple, round-robin procedure or a more sophisticated policy.

In response to the asserted flag, the CPU 25 raises its IPL to inhibit further interrupts from other ports and acknowledges the first port's interrupt request. (Step 56.) The contents of the first port's local buffer are then forwarded to the global buffer and stored as a "unit of cells", i.e., a complete packet. (Step 57.) The packet cells eventually propagate up to the top of the FIFO buffer and are transferred, in sequence, to the remaining outgoing ports of the multicast port group. (Step 58.)

While there has been shown and described an illustrative embodiment for incorporating the novel 2-stage buffering arrangement, it is to be understood that various other adaptations anti modifications may be made within the spirit and scope of the invention. For example, the invention is applicable to a multiprocessor switch having a processor associated with each port of the switch. For this latter embodiment, the control interface circuits 422 of FIG. 4 are replaced by link interface circuits and processors. Each processor is associated with a port and controls the packet transfers between the local buffers 42 and the global buffer 46. The CPU 25 controls the transfers between the global buffer and the outgoing ports.

Synchronization between the local buffers and global buffer is achieved by requiring that each processor 62 access a global semaphore upon reception of the last cell of a packet at the local buffer 42. Specifically, each processor performs a write operation of a predetermined value to a location 240 in main memory 24 that is shared by all the ports. Once access to the semaphore has been obtained, the processor 62 forwards the cells of the packet to the FIFO buffer, which eventually passes the cells, in sequence, to the remaining ports of the multicast port group.

In summary, the invention set forth herein increases the overall efficiency of a cell-switched network by maintaining the sequence of packet cells propagating through a switch of a multicast virtual circuit. Specifically, the cells of a packet that are received at a local buffer and passed to the global buffer are forwarded to the remaining ports of a multicast port group in an orderly manner, thereby obviating intermingling of different cells having the same VC number.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Apparatus in a cell-switched network, said apparatus having a multicast port group comprising a plurality of ports, said apparatus comprising:
   a plurality of local buffers, each associated with a respective one of said plurality of ports and configured to receive a plurality of packet cells at an incoming port of said multicast port group;
   a global buffer having inputs coupled to each of said plurality of local buffers and outputs coupled to each of said plurality of ports, said global buffer configured to store, in sequence, said plurality of packet cells from said plurality of local buffers and further configured to forward said plurality of packet cells, in sequence, to outgoing ports of said multicast port group;
   control means, coupled to said plurality of local buffers and said global buffer, for maintaining the integrity of each packet of said plurality of packet cells and for controlling the transfer of said plurality of packet cells from said each of said plurality of local buffers to said global buffer once said each of said plurality of local buffers has received an entire packet of said plurality of packet cells, and for controlling the transfer of said packet cells from said global buffer to said outgoing ports, through a multicast virtual circuit.

2. The apparatus of claim 1 further comprising a forwarding table, coupled to said control means, said forwarding table providing information identifying said outgoing ports of said multicast port group.

3. The apparatus of claim 2 wherein each of said local buffers is a queue having sufficient storage capacity to hold at least one entire packet of said plurality of packet cells received at said incoming port.

4. The apparatus of claim 3 Wherein said global buffer is a first-in, first-out buffer configured to store a plurality of entire packet of said plurality of packet cells received at said queues.

5. An arrangement of a switch in a cell-switched network, said switch having a multicast port group comprising a plurality of ports, said arrangement comprising:
- a plurality of local buffers, each associated with a respective one of said plurality of ports, each of said local buffers configured to store an entire packet of cells received at an incoming port of said multicast port group;
- a global buffer having inputs coupled to each of said plurality of local buffers and outputs coupled to each of said plurality of ports, said global buffer configured to store, in sequence, said entire packet of cells from at least each of said plurality of local buffers and further configured to forward said entire packet of cells, in sequence, to outgoing ports of said multicast port group;
- control means, coupled to said plurality of local buffers and said global buffer, for maintaining the integrity of said entire packet of cells and for controlling the transfer of said entire packet of cells from each of said plurality of local buffers to said global buffer once said each of said plurality of local buffers has received said entire packet of cells, and for controlling the transfer of said entire packet of cells from said global buffer to said outgoing ports, through a multicast virtual circuit.

6. A method for maintaining the integrity of a packet of a plurality of packet cells propagating through a multicast virtual circuit including a switch in a cell-switched network, said switch having a multicast port group comprising a plurality of ports, said method comprising the steps of:
- receiving said plurality of packet cells at an incoming port of said multicast port group;
- storing said plurality of packet cells at one of a plurality of local buffers, each of said local buffers being associated with a respective one of said plurality of ports;
- transferring said plurality of packet cells to a global buffer configured to store, in sequence, said plurality of packet cells from at least said one of said plurality of local buffers once said at least said one of said plurality of local buffers receives an entire packet of said plurality packet cells; and
- forwarding said entire packet of said plurality of packet cells, in sequence, from said global buffer to outgoing ports of said multicast port group through said multicast virtual circuit.

* * * * *